US 11,740,889 B2

(12) United States Patent
Fukuyo et al.

(10) Patent No.: US 11,740,889 B2
(45) Date of Patent: Aug. 29, 2023

(54) SOFTWARE UPDATE APPARATUS, SOFTWARE UPDATE METHOD, NON-TRANSITORY STORAGE MEDIUM STORING PROGRAM, VEHICLE, AND OTA MASTER

(71) Applicant: TOYOTA JIDOSHA KABUSHIKI KAISHA, Toyota (JP)

(72) Inventors: Satoru Fukuyo, Nisshin (JP); Tomoyasu Ishikawa, Nagoya (JP); Yusuke Satoh, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/368,397

(22) Filed: Jul. 6, 2021

(65) Prior Publication Data

US 2022/0012039 A1 Jan. 13, 2022

(30) Foreign Application Priority Data

Jul. 8, 2020 (JP) .................. 2020-117812

(51) Int. Cl.
*G06F 8/65* (2018.01)
*B60R 16/02* (2006.01)
*H04L 67/00* (2022.01)
*H04L 67/12* (2022.01)
*B60R 16/023* (2006.01)

(52) U.S. Cl.
CPC ............ *G06F 8/65* (2013.01); *B60R 16/0231* (2013.01); *H04L 67/12* (2013.01); *H04L 67/34* (2013.01)

(58) Field of Classification Search
CPC ..... G06F 8/65; B60R 16/0231; B60R 16/023; H04L 67/34; H04L 67/12; H04L 29/08
See application file for complete search history.

(56) References Cited

U.S. PATENT DOCUMENTS

| 2009/0300595 | A1* | 12/2009 | Moran ............... G06F 8/65 717/173 |
| 2018/0136924 | A1* | 5/2018 | Okuyama ............ G06F 8/65 |
| 2019/0243635 | A1* | 8/2019 | Van Sickle .......... G06F 8/654 |
| 2019/0294429 | A1 | 9/2019 | Mizutani et al. |

(Continued)

FOREIGN PATENT DOCUMENTS

| JP | 2011-148398 A | 8/2011 |
| JP | 2017-228107 A | 12/2017 |

(Continued)

*Primary Examiner* — S. Sough
*Assistant Examiner* — Cheneca Smith
(74) *Attorney, Agent, or Firm* — Oliff PLC

(57) ABSTRACT

A software update apparatus includes a communication unit that sends a request for downloading update data to a center, a storage unit that stores the downloaded update data, a control unit that executes, based on the update data, a control for installing, or installing and activating update software on one or more target electronic control units from among a plurality of electronic control units connected to each other via an in-vehicle network, and a determination unit that determines whether the vehicle is stopped and can be maintained in a stopped state. When a determination result of the determination unit is positive, the control unit restricts operations of the target electronic control units and executes the control for installing, or installing and activating.

16 Claims, 2 Drawing Sheets

(56) References Cited

U.S. PATENT DOCUMENTS

2020/0348923 A1* 11/2020 Mezaael ................. H04W 4/44
2021/0097784 A1*  4/2021 Castano ................. B60L 58/12
2021/0155252 A1   5/2021 Harata et al.
2021/0349709 A1  11/2021 Nakatsukasa et al.

FOREIGN PATENT DOCUMENTS

| JP | 2018-60323 A | 4/2018 |
| JP | 2018-86894 A | 6/2018 |
| JP | 2020-027630 A | 2/2020 |
| WO | 2019/070235 A1 | 4/2019 |
| WO | 2020/003515 A1 | 1/2020 |

* cited by examiner

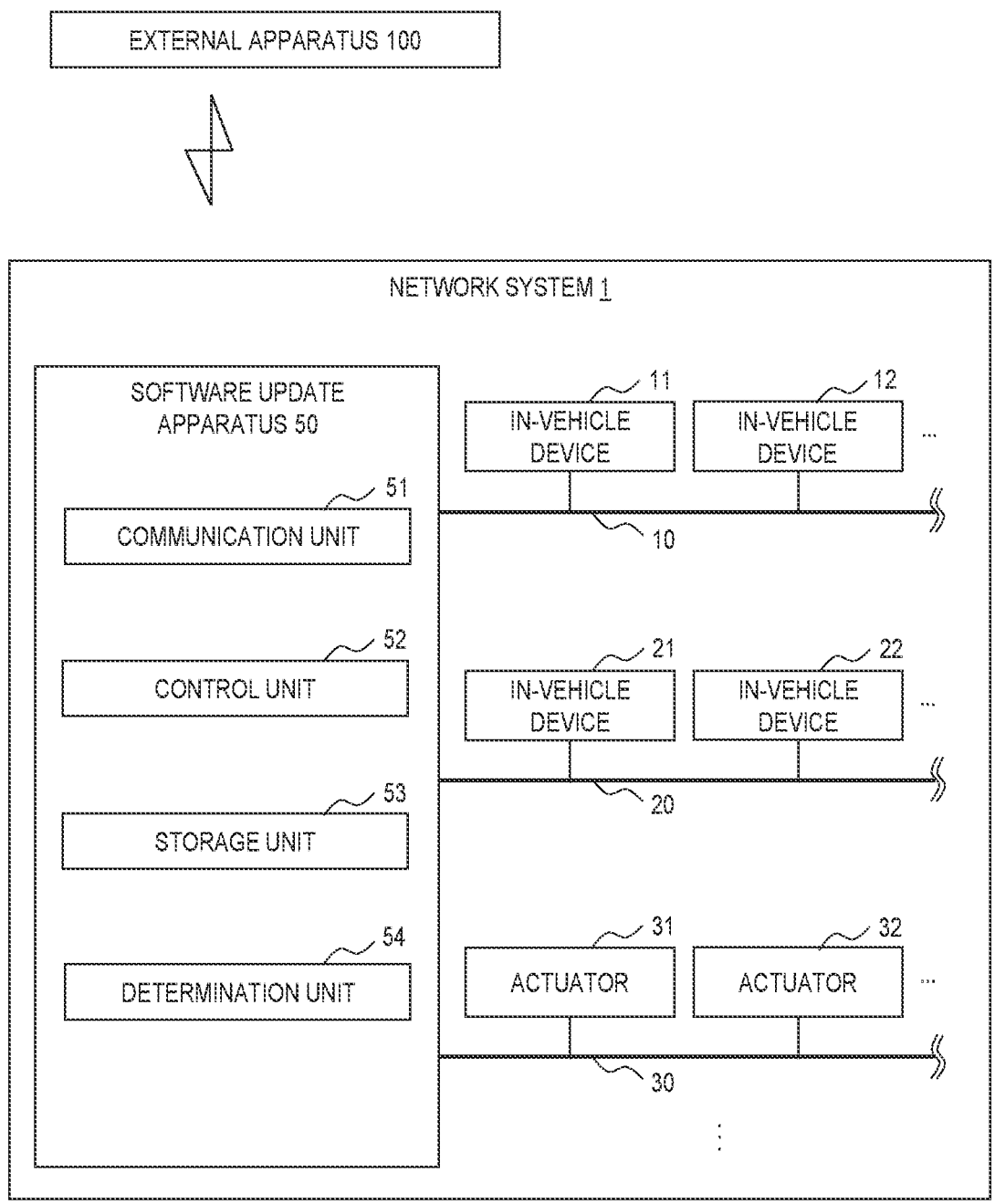

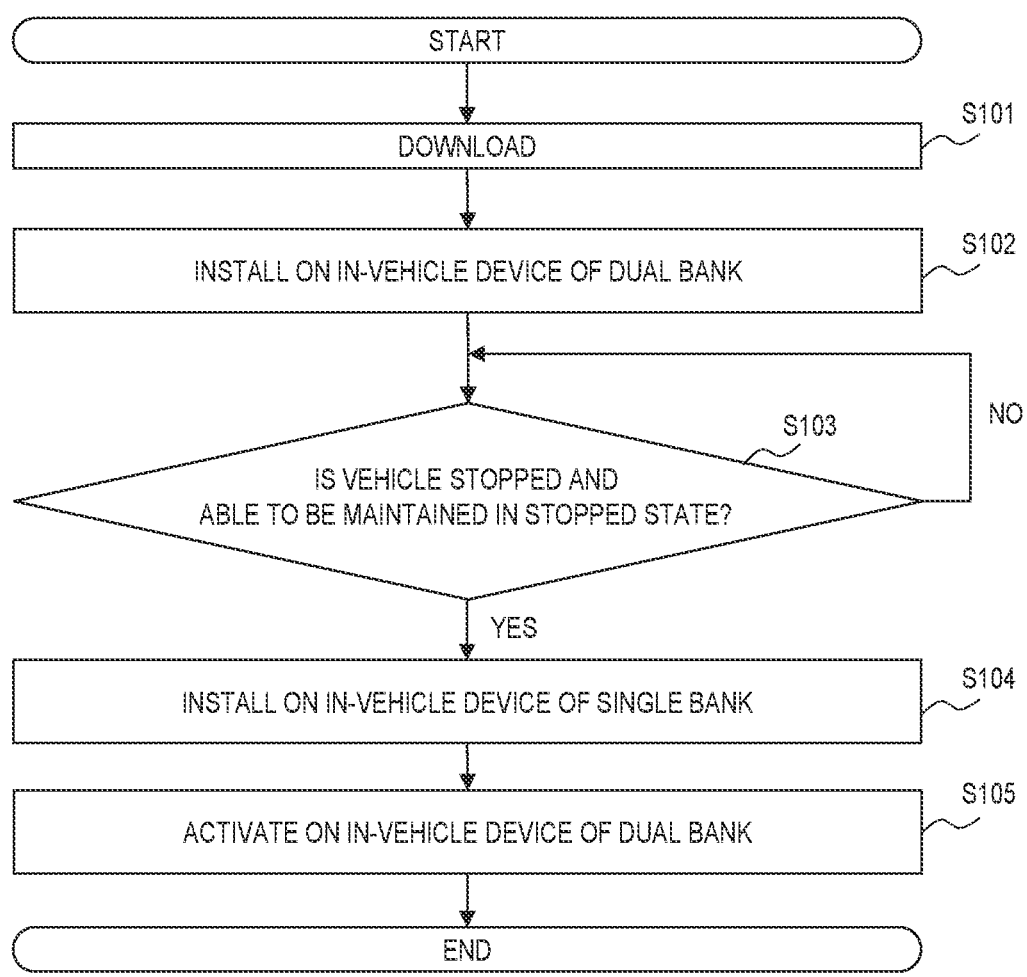

SOFTWARE UPDATE APPARATUS, SOFTWARE UPDATE METHOD, NON-TRANSITORY STORAGE MEDIUM STORING PROGRAM, VEHICLE, AND OTA MASTER

CROSS-REFERENCE TO RELATED APPLICATION

This application claims priority to Japanese Patent Application No. 2020-117812 filed on Jul. 8, 2020, incorporated herein by reference in its entirety.

BACKGROUND

1. Technical Field

The present disclosure relates to a software update apparatus, a software update method, a non-transitory storage medium storing the program, and an OTA master, each of which updates software of an in-vehicle device mounted on a vehicle, and the vehicle.

2. Description of Related Art

On a vehicle, a network system is mounted in which a plurality of in-vehicle devices, referred to as electronic control units (ECUs), is connected to each other via communication lines. Each in-vehicle device transmits and receives a message to and from the other in-vehicle devices in order to divide and execute each function of the vehicle.

An in-vehicle device typically includes a transitory storage unit, such as a processor and a RAM, or a non-volatile storage unit, such as a flash ROM. A program (software) executed by the processor is stored in the non-volatile storage unit. By rewriting the program as a newer version thereof and updating it, it is possible to enhance and improve functions of the in-vehicle devices.

Program updating includes a step of downloading for receiving update data from an external apparatus (a center) using wireless communication and the like, and a step of installing for writing an update program (update software) based on the downloaded update data in a storage unit of the in-vehicle device. In installation, there are an overwriting installation for overwriting a current program (a previous program) with the downloaded update program according to specifications of an in-vehicle device in one area (one side: a single bank) defined as an area for program storage from among storage areas of a storage unit and an other-side installation for writing the downloaded update program in an area (the other side) that is not an area (one side) in which a current program (a previous program) is stored from among two areas (two sides: a dual bank) defined as an area for the program storage.

In a case of the other-side installation, the step of program updating includes, in addition to respective steps of downloading and installing, a step of activating for configuring setting values, such as a start address of the update program such that the installed update program is set as an execution version.

In association with the program update of an ECU, Japanese Unexamined Patent Application Publication No. 2011-148398 discloses a technology in which a specific ECU functions as a master ECU, communicates with a server, and updates a program of the master ECU itself or a slave ECU.

SUMMARY

Since an in-vehicle device cannot execute a program when updating the program, such as when overwriting installing a program or activating a program installed on the other side, the in-vehicle device cannot operate and thus functions of a vehicle may be restricted. For this reason, such processing is executed in a state where the vehicle is stopped. However, even when a user temporarily stops the vehicle, there is a case where a request to cause the vehicle to travel occurs immediately thereafter. In such a case, when the overwriting installation or activation is started based only on the fact that the vehicle is stopped, the request cannot be satisfied until these processes are ended, and thus convenience is impaired.

The present disclosure provides a software update apparatus, a software update method, a non-transitory storage medium storing a program, and an OTA master that can execute a program updating process of an in-vehicle device without impairing convenience of a vehicle, and the vehicle.

A software update apparatus according to a first aspect of the present disclosure includes a communication unit that sends a request for downloading update data to a center, a storage unit that stores the downloaded update data, a control unit that executes, based on the update data, a control for installing, or installing and activating update software on one or more target electronic control units from among a plurality of electronic control units connected to each other via an in-vehicle network, and a determination unit that determines whether the vehicle is stopped and can be maintained in a stopped state. When a determination result of the determination unit is positive, the control unit restricts operations of the target electronic control units and executes the control for installing, or installing and activating.

In the first aspect, based on a state of surroundings of the vehicle, the determination unit may determine whether the vehicle can be maintained in the stopped state.

In the first aspect, the determination unit may determine that the vehicle can be maintained in the stopped state when detecting absence of a person or an object within the surroundings of the vehicle as the state.

In the first aspect, the determination unit may determine that the vehicle can be maintained in the stopped state when detecting no movement of a person or an object within the surroundings of the vehicle as the state.

In the first aspect, the determination unit may detect the state using a sensor included in the vehicle.

In the first aspect, the determination unit may detect the state using wireless communication with another vehicle.

In the first aspect, the determination unit may detect the state using wireless communication with a device provided on a road.

In the first aspect, upon receiving a notification from the center using wireless communication that the center has determined that the vehicle can be maintained in the stopped state based on a current position of the vehicle, the determination unit may determine that the vehicle can be maintained in the stopped state.

In the first aspect, the determination unit may determine that the vehicle can be maintained in the stopped state when detecting connection between a cable and the vehicle.

In the first aspect, before restricting operations of the target electronic control units, the control unit may execute at least one of turning off power of the vehicle, setting a shift position to parking, and causing a power source to stop generation of driving force.

A second aspect of the present disclosure is a software update method executed by a computer of a software update apparatus. The software update method includes a step of sending a request for downloading update data to a center, a step of storing the downloaded update data, a step of determining whether a vehicle is stopped and can be maintained in a stopped state, and a step of executing, based on the update data, a control for installing, or installing and activating update software on one or more target electronic control units from among a plurality of electronic control units connected to each other via an in-vehicle network, restricting operations of the target electronic control units when a determination result is positive, and executing the control for installing, or installing and activating.

A third aspect of the present disclosure is a non-transitory storage medium storing a program executable on a computer of a software update apparatus. The program causes the computer to execute functions of sending a request for downloading update data to a center, storing the downloaded update data, determining whether a vehicle is stopped and can be maintained in a stopped state, and executing, based on the update data, a control for installing, or installing and activating update software on one or more target electronic control units from among a plurality of electronic control units connected to each other via an in-vehicle network, restricting operations of the target electronic control units when a determination result is positive, and executing the control for installing, or installing and activating.

A fourth aspect of the present disclosure is a vehicle including a software update apparatus.

An OTA master according to a fifth aspect of the present disclosure includes a communication unit that sends a request for downloading update data to a center, a storage unit configured to store the downloaded update data, a control unit configured to execute, based on the update data, a control for installing, or installing and activating update software on one or more target electronic control units from among a plurality of electronic control units connected to each other via an in-vehicle network, and a determination unit configured to determine whether a vehicle is stopped and can be maintained in a stopped state. When a determination result of the determination unit is positive, the control unit may restrict operations of the target electronic control units and execute the control for installing, or installing and activating.

A sixth aspect of the present disclosure is a software update method executed by a computer of an OTA master. The software update method includes a step of sending a request for downloading update data to a center, a step of storing the downloaded update data, a step of determining whether a vehicle is stopped and can be maintained in a stopped state, and a step of executing, based on the update data, a control for installing, or installing and activating update software on one or more target electronic control units from among a plurality of electronic control units connected to each other via an in-vehicle network, restricting operations of the target electronic control units when a determination result is positive, and executing the control for installing, or installing and activating.

A seventh aspect of the present disclosure is a non-transitory storage medium storing a program executable on a computer of an OTA master. The program causes the computer to execute functions of sending a request for downloading update data to a center, storing the downloaded update data, determining whether a vehicle is stopped and can be maintained in a stopped state, and executing, based on the update data, a control for installing, or installing and activating update software on one or more target electronic control units from among a plurality of electronic control units connected to each other via an in-vehicle network, restricting operations of the target electronic control units when a determination result is positive, and executing the control for installing, or installing and activating.

With each aspect of the present disclosure, in a program updating process of an in-vehicle device, a process for restricting an operation of an in-vehicle device is executed when it can be determined that not only is the vehicle stopped but it also can be maintained in a stopped state. Thus, even when a user temporarily stops the vehicle, there is a case where a request to cause the vehicle to travel occurs immediately thereafter, a process for restricting the operation of the in-vehicle device is not executed so that the request can be easily satisfied and convenience is enhanced.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 1 is a configuration diagram of a network system according to one embodiment; and FIG. 2 is a flowchart illustrating a process according to the embodiment.

DETAILED DESCRIPTION OF EMBODIMENTS

Embodiments

Configuration

FIG. 1 illustrates a configuration diagram of a network system 1 according to one embodiment. The network system 1 is mounted on a vehicle. The network system 1 includes a software update apparatus 50. A plurality of buses 10, 20, 30, . . . is connected to the software update apparatus 50 (an OTA master). A plurality of in-vehicle devices (electronic control units) 11, 12, . . . is connected to the bus 10. A plurality of in-vehicle devices 21, 22, . . . is connected to the bus 20. A plurality of actuators 31, 32, . . . is connected to the bus 30. In FIG. 1 and the following descriptions, the buses 10, 20, 30 are exemplified as buses, the in-vehicle devices 11, 12, 21, 22 are exemplified as in-vehicle devices, and actuators 31, 32 are exemplified as actuators, but the number of buses, in-vehicle devices, or actuators is not limited.

The software update apparatus 50 includes a communication unit (a communication module) 51, which communicates with an external apparatus 100 (a center), a control unit 52 that controls updating of programs of the respective in-vehicle devices 11, 12, 21, 22 based on update data provided from the external apparatus 100, and a determination unit 54 to be described below. The software update apparatus 50 is typically a computer that includes a non-volatile storage unit (a storage) 53, such as a flash ROM, a processor that executes various processes by reading a program from a non-volatile storage unit 53 and executing it, and a transitory storage unit, such as a RAM, that stores a part of a program or data. The processor executes functions of the control unit 52 and the determination unit 54 to be described below.

Further, the control unit 52 of the software update apparatus 50 also controls or relays communication between the external apparatus 100 and the respective in-vehicle devices 11, 12, 21, 22, communication between the in-vehicle devices 11, 12, 21, 22, communication between the respective in-vehicle devices 11, 12, 21, 22 and the respective actuators 31, 32 via the respective buses 10, 20, 30. In this manner, the software update apparatus 50 also functions as a relay apparatus that relays communication.

The respective in-vehicle devices 11, 12, 21, 22 communicate with each other to execute various processes for controlling the vehicle. Similar to the software update apparatus 50, these in-vehicle devices are typically computers that include storage units (storages) and processors, respectively.

The actuators 31, 32 are devices that cause a vehicle or its parts, such as a brake, an engine, or a power steering device, to generate a mechanical action and operate based on instructions from the in-vehicle devices 11, 12, 21, 22.

The in-vehicle devices 11, 12, 21, 22 or the actuators 31, 32 may respectively include various sensors that acquire operating states of the respective in-vehicle states or the actuators, a state of the vehicle, or a state of the surroundings of the vehicle. Further, such sensors may be directly connected to the buses 10, 20, 30, respectively.

The control unit 52 of the software update apparatus 50 can update the programs stored in the respective storage units of the in-vehicle devices 11, 12, 21, 22. In other words, the software update apparatus 50 executes controls for downloading, installation, or further, activation. The downloading is a process for receiving and storing update data (a distribution package) for updating any of the programs of the in-vehicle devices 11, 12, 21, 22, which is transmitted from the external apparatus 100. A control for downloading can include not only execution of the downloading but also controls of a series of processes associated with the downloading, such as a determination on whether the execution of the downloading is possible and verification of the update data. Installation is a process for writing a program (update software) of an updated version on a storage unit of an in-vehicle device to be updated, based on the downloaded update data. A control for installation can include not only execution of the installation but also controls of a series of processes associated with the installation, such as a determination on whether the execution of the installation is possible, sending the update data, and verification of the updated version of the program. Activation is a process for making the updated version of the installed program effective (activate). A control for activation can include not only execution of the activation but also controls of a series of processes associated with the activation, such as a determination on whether the execution of the activation is possible and verification of a result of the execution.

In the control for installation, when the update data includes an update program itself, the control unit 52 can transmit the update program to the in-vehicle devices. Alternatively, when the update data includes compressed data, difference data, or divided data of the update program, the control unit 52 may generate the update program by, for example, developing or assembling the update data and transmit it to the in-vehicle devices 11, 12, 21, 22. Alternatively, the control unit 52 may transmit the update data to the in-vehicle devices 11, 12, 21, 22, and the in-vehicle devices 11, 12, 21, 22 may generate the update program by, for example, developing or assembling the update data.

The installation itself for writing the update program on a second storage unit of the in-vehicle device may be executed by the control unit 52, by the in-vehicle device that has received an instruction from the control unit 52, or autonomously by the in-vehicle device that has received the update data (or the update program) without the explicit instruction from the control unit 52.

The activation itself for making the installed update program effective may be executed by the control unit 52, by the in-vehicle device that has received an instruction from the control unit 52, or autonomously by the in-vehicle device without the explicit instruction from the control unit 52, following the installation.

Such a program updating process can be executed continuously or in parallel for each of the plurality of in-vehicle devices.

Hereinbelow, an example of a process according to the present embodiment will be described. FIG. 2 is a flowchart illustrating an example of a program updating process executed by the software update apparatus 50. This process is started when, for example, the software update apparatus 50 requests the update data from the external apparatus 100.

(Step S101) The communication unit 51 receives, from the external apparatus 100, the update data for updating one or more programs of the in-vehicle devices included in the vehicle. The control unit 52 stores the update data in the storage unit 53 of the software update apparatus 50 (downloading).

(Step S102) When there are one or more of the above-described dual bank type in-vehicle devices among the in-vehicle devices of which the programs are to be updated, the control unit 52 controls the communication unit 51 thereby communicating with each of the above in-vehicle devices and causing each in-vehicle device to execute the installation of the program on the other side based on the downloaded update data. When there is no dual bank type in-vehicle device, this step is not executed.

(Step S103) The determination unit 54 determines whether the vehicle is stopped and can be maintained in a stopped state. This determination can be made by acquiring one or both of the state of the subject vehicle and the state of the surroundings of the subject vehicle from the in-vehicle devices, the actuators, the sensors, or the like included in the vehicle, or another vehicle.

The determination unit 54 can determine that the vehicle is in the stopped state based on, for example, the facts that the vehicle is powered off (power off, ignition off), a value of a vehicle speed is zero, and a shift position is positioned at parking.

The determination unit 54 can determine that the vehicle can be maintained in the stopped state by, for example, detecting, using a sensor, such as a camera or an ultrasonic sensor, absence of a person or an object that may become an obstacle to maintaining the stopped state of the vehicle, and no movement of a person or an object that is approaching the surroundings of the vehicle, which are likely to come into contact with the vehicle. The type of sensor is not limited.

Alternatively, the determination unit 54 can make the determination even when the vehicle does not include a sensor that detects such a person or an object within the surroundings of the vehicle. For example, in a case where another vehicle including such a sensor passes the surroundings of the subject vehicle, the determination unit 54 can make the determination when the communication unit 51 receives, from another vehicle using wireless communication, a notification indicating that such a person or an object, and a movement of a person or an object approaching the surroundings of the subject vehicle are absent. Alternatively, the determination unit 54 can make the determination when, for example, the communication unit 51 receives a notification indicating that such a person or an object, and a movement of a person or an object approaching the surroundings of the subject vehicle are absent, from a device which includes such a sensor and is provided on the road, in a parking lot, or the like, using wireless communication. The surroundings of the subject vehicle may be a range of a predetermined distance from the vehicle, or a variable range that changes depending on a condition, such as the accuracy of a sensor.

For example, in a case where a user parks the vehicle on the roadside, when a pedestrian or another vehicle around the subject vehicle approaches the subject vehicle for, for example, passage, it may be necessary for the user to immediately move the vehicle so as not to obstruct the passage. However, in the case where such a person or an object, and a movement of a person or an object approaching the surroundings of the subject vehicle are absent within a predetermined distance from the vehicle, as compared to a case where such a person or an object, or a movement is present, it can be considered that a request to move the vehicle is less likely to occur and a probability that the vehicle can be maintained in the stopped state for a certain period of time is higher. Therefore, the determination unit 54 can make the determination using the presence or absence. The determination unit 54 may detect a range in which a person or an object and a movement of a person or an object approaching the surroundings of the subject vehicle are absent, and determine that the vehicle can be maintained in the stopped state when the range is wider than a predetermined range. As such, a method and a tool used for determination are not limited.

Alternatively, the determination unit 54 can determine that the vehicle can be maintained in the stopped state by, for example, detecting the fact that the current position of the vehicle is at a place in which a request to move the vehicle is less likely to occur in a case where, for example, the vehicle includes a positioning sensor, such as a GPS. The determination unit 54 can determine that a request to move the vehicle is less likely to occur and the vehicle can be maintained in the stopped state in a case where, for example, a type of vehicle position is specified based on the vehicle position, a map that is prepared in advance, or the like, and the vehicle position is at a specific type of place in which the vehicle is parked for a certain period of time, such as a garage at home or at a maintenance shop. In addition, for example, an apparatus outside the vehicle, such as the external apparatus 100, may acquire the vehicle position and make the determination, and the vehicle may acquire a determination result.

Alternatively, the determination unit 54 can determine that the vehicle can be maintained in the stopped state by detecting, using a sensor, connection between a charging cable and the vehicle in a case where, for example, the vehicle is an electric vehicle or a plug-in hybrid vehicle. Alternatively, the determination unit 54 can determine that the vehicle can be maintained in the stopped state by detecting, using a sensor, connection between a refueling cable and the vehicle in a case where, for example, the vehicle is a gasoline vehicle or a hybrid vehicle. Alternatively, the determination unit 54 can determine that the vehicle can be maintained in the stopped state by detecting, using a sensor or the in-vehicle device, connection between a communication cable used for reprogramming or the like and the vehicle. When such various cables are connected to the vehicle, it can be considered that the vehicle is parked at a place in which the vehicle can be maintained in the stopped state, such as a garage at home or a charging station, and it is less necessary for the user to cause the vehicle to immediately travel.

Alternatively, the determination unit 54 may combine a plurality of the above-described respective conditions and determine that the vehicle can be maintained in the stopped state in a case where one of the combined conditions is satisfied, or in a case where all the conditions are satisfied. Alternatively, the determination unit 54 may make the determination using conditions other than the above-described conditions. The reliability of the determination can be enhanced by additionally using a determination result by an apparatus outside the vehicle, such as the external apparatus 100.

In this step, when the determination unit 54 has determined that the vehicle is stopped and can be maintained in the stopped state, the process proceeds to step S104. Otherwise, the execution of this step is, for example, periodically repeated until the determination unit 54 determines that the vehicle is stopped and can be maintained in the stopped state.

(Step S104) When there are one or more of the above-described single bank type in-vehicle devices among the in-vehicle devices of which the programs are to be updated, the control unit 52 controls the communication unit 51 thereby communicating with the above respective in-vehicle devices and causing the in-vehicle devices to execute the overwriting installation of the program based on the downloaded update data. When there is no single bank type in-vehicle device, this step is not executed.

(Step S105) When there are one or more of the above-described dual bank type in-vehicle devices among the in-vehicle devices of which the programs are to be updated, the control unit 52 controls the communication unit 51 thereby communicating with the above respective in-vehicle devices and causing the in-vehicle devices to activate the program that has been installed on the other side in step S102. When there is no dual bank type in-vehicle device, this step is not executed. Then, this process is ended.

The order of processes in steps S104 and S105 is not limited. Moreover, these processes can be executed in parallel. Further, before executing these processes, at least one of turning off power of the vehicle, setting the shift position to parking, and causing a power source to stop generation of driving force may be executed. For example, in step S102, when the stopped state of the vehicle is confirmed based on the facts that the value of the vehicle speed is zero and the shift position is positioned at parking, when turning off the power of the vehicle is further executed in this step, the stopped state of the vehicle can be maintained with more certainty. Further, until the processes of steps S104 and S105 are ended, an operation for causing the vehicle to travel, such as starting a power source, is restricted. Further, in this example, as predetermined processes for restricting the operation of the in-vehicle device, a process for installing a program in a single bank type in-vehicle device and a process for activating a program in a dual bank type in-vehicle device are exemplified, but the process to be restricted is not limited thereto, and other processes may be included.

Advantageous Effect

As described above, in the present embodiment, in the program update process of the in-vehicle device, the process of restricting the operation of the in-vehicle device is executed when it can be determined that not only is the vehicle stopped but it can also be maintained in the stopped state. As such, even when a user temporarily stops the vehicle, there is a case where a request to cause the vehicle to travel occurs immediately thereafter, a process for restricting the operation of the in-vehicle device is not executed so that the request can be easily satisfied and convenience is enhanced.

Although one example of the embodiment has been described above, the function of the control unit 52 may be provided in one of the in-vehicle devices.

The disclosed technology can be regarded as not only a software update apparatus, but also a network system including the software update apparatus, a method executed by a computer included in the software update apparatus, a program and a non-transitory computer-readable storage medium storing the program, and a vehicle including the software update apparatus.

The present disclosure is useful for a software update apparatus that updates a program of an in-vehicle device mounted on a vehicle.

What is claimed is:

1. A software update method executed by a computer of a software update apparatus, the software update method comprising:
   sending a request for downloading update data to a center;
   storing the downloaded update data;
   determining whether a vehicle is stopped and is able to be maintained in a stopped state; and
   executing, based on the update data, a control for installing update software on one or more dual bank target electronic control units from among a plurality of electronic control units connected to each other via an in-vehicle network, and executing the control for installing the update software to one or more single bank target electronic control units after a determination result is positive and after installing the updated software in the one or more dual bank target electronic control units.

2. A software update apparatus comprising:
   a transmitter/receiver configured to send a request for downloading update data to a center;
   a memory configured to store the downloaded update data; and
   an electronic control unit that is configured to:
      install, based on the update data, update software on one or more dual bank target electronic control units from among a plurality of electronic control units connected to each other via an in-vehicle network; and
      determine whether a vehicle is stopped and is able to be maintained in a stopped state, after installing the updated software in the one or more dual bank target electronic control units,
   wherein the electronic control unit is configured to, when a determination result of the electronic control unit is positive, install the update software to one or more single bank target electronic control units.

3. The software update apparatus according to claim 2, wherein the electronic control unit is configured to, based on a state of surroundings of the vehicle, determine whether the vehicle is able to be maintained in the stopped state.

4. The software update apparatus according to claim 3, wherein the electronic control unit is configured to determine that the vehicle is able to be maintained in the stopped state when detecting absence of a person or an object within the surroundings of the vehicle as the state.

5. The software update apparatus according to claim 3, wherein the electronic control unit is configured to determine that the vehicle is able to be maintained in the stopped state when detecting no movement of a person or an object within the surroundings of the vehicle as the state.

6. The software update apparatus according to claim 3, wherein the electronic control unit is configured to detect the state using a sensor included in the vehicle.

7. The software update apparatus according to claim 3, wherein the electronic control unit is configured to detect the state using wireless communication with another vehicle.

8. The software update apparatus according to claim 3, wherein the electronic control unit is configured to detect the state using wireless communication with a device provided on a road.

9. The software update apparatus according to claim 2, wherein the electronic control unit is configured to, upon receiving a notification from the center using wireless communication that the center has determined that the vehicle is able to be maintained in the stopped state based on a current position of the vehicle, determine that the vehicle is able to be maintained in the stopped state.

10. The software update apparatus according to claim 2, wherein the electronic control unit is configured to determine that the vehicle is able to be maintained in the stopped state when detecting connection between a cable and the vehicle.

11. The software update apparatus according to claim 2, wherein the electronic control unit is configured to, before restricting operations of the target electronic control units, execute at least one of turning off power of the vehicle, setting a shift position to parking, and causing a power source to stop generation of driving force.

12. A vehicle comprising the software update apparatus according to claim 2.

13. A non-transitory storage medium storing a program executable on a computer of a software update apparatus, the program causing the computer to execute the following functions:
   sending a request for downloading update data to a center;
   storing the downloaded update data;
   determining whether a vehicle is stopped and is able to be maintained in a stopped state: and
   executing, based on the update data, a control for installing update software on one or more dual bank target electronic control units from among a plurality of electronic control units connected to each other via an in-vehicle network, and executing the control for installing the update software to one or more single bank target electronic control units when a determination result is positive and after installing the updated software in the one or more dual bank target electronic control units.

14. An Over The Air (OTA) master comprising:
   a transmitter/receiver configured to send a request for downloading update data to a center;
   a memory configured to store the downloaded update data;
   an electronic control unit that is configured to:
      install, based on the update data, a control for installing update software on one or more dual bank target electronic control units from among a plurality of electronic control units connected to each other via an in-vehicle network; and determine whether a vehicle is stopped and is able to be maintained in a stopped state, after installing the updated software in the one or more dual bank target electronic control units, wherein the electronic is configured to, when a determination result of the electronic control unit is positive, install the update software to one or more single bank target electronic control units.

15. A software update method executed by a computer of an Over The Air (OTA) master, the software update method comprising:

sending a request for downloading update data to a center;
storing the downloaded update data;
determining whether a vehicle is stopped and is able to be maintained in a stopped state; and
executing, based on the update data, a control for installing update software on one or more dual bank target electronic control units from among a plurality of electronic control units connected to each other via an in-vehicle network, and executing the control for installing the update software to one or more single bank target electronic control units after a determination result is positive and after installing the updated software in the one or more dual bank target electronic control units.

16. A non-transitory storage medium storing a program executable on a computer of an Over The Air (OTA) master, the program causing the computer to execute the following functions:

sending a request for downloading update data to a center;
storing the downloaded update data;
determining whether a vehicle is stopped and is able to be maintained in a stopped state; and
executing, based on the update data, a control for installing update software on one or more dual bank target electronic control units from among a plurality of electronic control units connected to each other via an in-vehicle network, and executing the control for installing the update software to one or more single bank target electronic control units when a determination result is positive and after installing the updated software in the one or more dual bank target electronic control units.

* * * * *